(12) United States Patent
Liang et al.

(10) Patent No.: US 11,855,289 B2
(45) Date of Patent: Dec. 26, 2023

(54) NEGATIVE ELECTRODE ACTIVE MATERIAL, PROCESS FOR PREPARING THE SAME, AND BATTERY, BATTERY MODULE, BATTERY PACK AND APPARATUS RELATED TO THE SAME

(71) Applicant: Contemporary Amperex Technology Co., Limited, Ningde (CN)

(72) Inventors: Chengdu Liang, Ningde (CN); Yuzhen Zhao, Ningde (CN); Yingjie Guan, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 152 days.

(21) Appl. No.: 17/563,071

(22) Filed: Dec. 28, 2021

(65) Prior Publication Data

US 2022/0123314 A1  Apr. 21, 2022

Related U.S. Application Data

(63) Continuation of application No. PCT/CN2020/103107, filed on Jul. 20, 2020.

(30) Foreign Application Priority Data

Jul. 29, 2019 (CN) .......................... 201910689512.6

(51) Int. Cl.
*H01M 4/62* (2006.01)
*H01M 4/04* (2006.01)
(Continued)

(52) U.S. Cl.
CPC ........... *H01M 4/62* (2013.01); *H01M 4/0402* (2013.01); *H01M 4/364* (2013.01);
(Continued)

(58) Field of Classification Search
CPC ...... H01M 4/62; H01M 4/0402; H01M 4/364; H01M 10/0525; H01M 2004/021;
(Continued)

(56) References Cited

U.S. PATENT DOCUMENTS

2012/0244428 A1  9/2012  Park et al.
2020/0313192 A1*  10/2020  Wada ................ C08F 220/1804

FOREIGN PATENT DOCUMENTS

CN  1237003 A  12/1999
CN  103456928 A  12/2013
(Continued)

OTHER PUBLICATIONS

The First Office Action for Chinese Application No. 201910689512.6, dated Mar. 4, 2023, 8 pages.
(Continued)

*Primary Examiner* — Gary D Harris
(74) *Attorney, Agent, or Firm* — East IP P.C.

(57) ABSTRACT

The present application provides a negative electrode active material, a process, a battery, a battery module, a battery pack and an apparatus related to the same. The negative electrode active material comprises a core material and a polymer modified coating on at least a part of a surface of core material; wherein the core material is one or more of a silicon-based negative electrode material and a tin-based negative electrode material; the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere. The present application can reduce damage to the surface structure of the negative electrode active material, reduce loss of active ions and capacity, meanwhile can well improve coulomb efficiency and cycle performance of the battery.

23 Claims, 4 Drawing Sheets

(51) Int. Cl.
  *H01M 4/36* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(58) Field of Classification Search
  CPC ......... H01M 2004/027; H01M 4/0471; H01M 4/1391; H01M 4/366; H01M 4/622; H01M 4/483; H01M 4/386; H01M 4/387; H01M 4/628; H01M 10/054; Y02E 60/10
  USPC ........................................................ 429/212
  See application file for complete search history.

(56) References Cited

FOREIGN PATENT DOCUMENTS

| | | |
|---|---|---|
| CN | 103688395 A | 3/2014 |
| CN | 104157875 A | 11/2014 |
| CN | 104518209 A | 4/2015 |
| CN | 104334613 B | 12/2016 |
| CN | 106887592 A | 6/2017 |
| CN | 107210431 A | 9/2017 |
| CN | 107851776 A | 3/2018 |
| CN | 109585829 A | 4/2019 |
| CN | 109792037 A | 5/2019 |
| CN | 111146422 A | 5/2020 |
| JP | 2020161345 A | 10/2020 |
| KR | 20150040141 A | 4/2015 |
| WO | 2018213060 A1 | 11/2018 |

OTHER PUBLICATIONS

The Decision to Grant a Patent for Invention for Jpanese Application No. 2021-555013, dated Mar. 20, 2023, 5 pages.
The International search report for PCT Application No. PCT/CN2020/103107, dated Oct. 22, 2020, 7 pages.
The extended European search report for EP Application No. 20848520.1, dated May 24, 2022, 5 pages.
The First Office Action for Indian Application No. 202117057308, dated Apr. 6, 2022, 6 pages.
The First Office Action for Japanese Application No. 2021-555013, dated Oct. 11, 2022, 6 pages.
The Second Office Action for Chinese Application No. 201910689512.6, dated Sep. 1, 2023, 14 pages.

\* cited by examiner

NEGATIVE ELECTRODE ACTIVE MATERIAL, PROCESS FOR PREPARING THE SAME, AND BATTERY, BATTERY MODULE, BATTERY PACK AND APPARATUS RELATED TO THE SAME

CROSS-REFERENCE TO RELATED APPLICATION

This application is a continuation of International Application No. PCT/CN2020/103107, filed on Jul. 20, 2020, which claims priority to Chinese Patent Application No. 201910689512.6 entitled "Negative Electrode Active Material and Battery" and filed on Jul. 29, 2019, both of which are incorporated herein by reference in their entireties.

TECHNICAL FIELD

This application relates to the field of batteries, and in particular to a negative electrode active material, a process for preparing the same, and a battery, a battery module, a battery pack and an apparatus related to the same.

BACKGROUND

In recent years, due to the higher requirement of the electric vehicle industry for energy density, a lot of research has been carried out into high-capacity negative electrode active materials. Silicon-based and tin-based negative electrode materials are valued for their theoretical gram capacity much higher than that of graphite. Nevertheless, the silicon-based and tin-based materials have serious volume effects, which will cause huge volume expansion during charging. As a result, during charging and discharging, the negative electrode active material is easily cracked to be pulverized. It is difficult to form a stable SEI (solid electrolyte interphase) film on its surface. This leads to overly fast fading of the battery capacity, and very poor cycle performance. In addition, silicon, as a semiconductor material, has defects of relatively low electrical conductivity and relatively serious irreversibility of active ions during charging and discharging, which would also affect the cycle performance of batteries.

SUMMARY

The first aspect of the present application provides a negative electrode active material, wherein the negative electrode active material comprises a core material and a polymer modified coating on at least part of a surface of the core material. The core material is one or more of a silicon-based negative electrode material and a tin-based negative electrode material. The negative electrode active material has a weight loss rate satisfying 0.2%≤weight loss rate≤2% in a thermogravimetric analysis test wherein temperature is elevated from 25° C. to 800° C. under a non-oxidizing inert gas atmosphere.

It is surprisingly found that the negative electrode active material provided in the present application can reduce damage of the surface structure of the negative electrode active material during charging and discharging of a battery, reduce loss of active ions, and reduce capacity loss of the battery. Therefore, the present application can well improve Coulombic efficiency and cycle performance of the battery.

In any embodiment as mentioned above, the weight loss rate satisfies 0.3%≤weight loss rate≤1%. Under the condition that the weight loss rate falls within the given range, the Coulombic efficiency and cycle performance of the battery can be further improved.

In any embodiment as mentioned above, the polymer modified coating comprises nitrogen element and a —C=N— bond. Under the condition that the polymer-modified coating includes the —C=N— bond, the cycle performance of the battery is further improved.

In any embodiment as mentioned above, the nitrogen element has a mass percentage of from 0.1% to 0.65% in the negative electrode active material; and optionally, the nitrogen element has a mass percentage of from 0.15% to 0.5% in the negative electrode active material.

In any embodiment as mentioned above, the polymer-modified coating comprises sulfur element and a —C—S— bond and/or a —S—S— bond. Under the condition that the negative electrode active material satisfies this condition, the cycle performance of the battery can be further improved.

In any embodiment as mentioned above, the negative electrode active material has a volume particle size distribution width (Dv90-Dv10)/Dv50 of from 0.5 to 2.5; and optionally, the negative electrode active material has a volume particle size distribution width (Dv90-Dv10)/Dv50 of from 0.8 to 2.0.

In any embodiment as mentioned above, the negative electrode active material has a number particle size Dn10 of from 0.17 μm to 3 μm; and optionally, the negative electrode active material has a number particle size Dn10 of from 0.2 μm to 1.5 μm.

In any embodiment as mentioned above, an X-ray diffraction spectrum of the negative electrode active material has a diffraction peak whose full width at half maxima is from 4° to 12° at the diffraction angle 2θ of from 19° to 27°; and optionally, the full width at half maxima is from 5° to 10°. Under the condition that the diffraction peak of the negative electrode active material falls within the above range, the cycle life of the battery can be further improved.

In any embodiment as mentioned above, a Raman spectrum of the negative electrode active material has scattering peaks at the Raman shifts of from 1320 $cm^{-1}$ to 1410 $cm^{-1}$ and from 1550 $cm^{-1}$ to 1650 $cm^{-1}$, respectively. The intensity of scattering peak at the Raman shift of from 1320 $cm^{-1}$ to 1410 $cm^{-1}$ is denoted as $I_D$, and the intensity of scattering peak at the Raman shift of from 1550 $cm^{-1}$ to 1650 $cm^{-1}$ is denoted as $I_G$, and wherein $I_D$ and $I_G$ satisfy 1.60≤$I_D$/$I_G$≤2.50; and optionally, $I_D$ and $I_G$ satisfy 1.80≤$I_D$/$I_G$≤2.40. Under the condition that the ratio of $I_D$ to $I_G$ falls within the above range, the initial Coulombic efficiency, cycle performance and energy density of the battery can be further improved.

In any embodiment as mentioned above, the negative electrode active material has a compaction density of from 1.1 $g/cm^3$ to 1.7 $g/cm^3$ measured under a pressure of 5 tons (equivalent to 49 KN); and optionally, the negative electrode active material has a compaction density of from 1.2 $g/cm^3$ to 1.5 $g/cm^3$ measured under a pressure of 5 tons (equivalent to 49 KN).

In any embodiment as mentioned above, the silicon-based negative electrode material is one or more selected from elemental silicon, a silicon-carbon composite, a silicon-oxygen compound, a silicon-nitrogen compound, and a silicon alloy; and
the tin-based negative electrode material is one or more selected from elemental tin, a tin-oxygen compound, and a tin alloy.

In any embodiment as mentioned above, the silicon-based negative electrode material is selected from the silicon-oxygen compound.

The second aspect of the present application provides a process for preparing the negative electrode active material according to the first aspect of the present application, comprising the steps of:

dissolving a polymer precursor in a solvent, and stirring until uniform dispersion, to obtain a solution of the polymer precursor;

adding a core material into the solution of the polymer precursor, and stirring, to obtain a mixed slurry, wherein the core material is one or more selected from a silicon-based negative electrode material and a tin-based negative electrode material;

placing the mixed slurry in a spray dryer or a wet coating machine, and drying it under a non-oxidizing inert gas atmosphere, to obtain a solid powder; and performing heat treatment to the solid powder under a non-oxidizing inert gas atmosphere at a temperature of from 200° C. to 450° C., to obtain the negative electrode active material;

wherein the negative electrode active material comprises the core material and a polymer-modified coating on at least part of the surface of the core material; the core material is one or more of a silicon-based negative electrode material and a tin-based negative electrode material; and the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere.

The third aspect of the present application provides a battery, comprising the negative electrode active material according to the first aspect of the present application or the negative electrode active material prepared according to the process of the second aspect of the present application.

The fourth aspect of the present application provides a battery module, comprising the battery according to the third aspect of the present application.

The fifth aspect of the present application provides a battery pack, comprising the battery module according to the fourth aspect of the present application.

The sixth aspect of the present application provides an apparatus, comprising at least one of the battery according to the third aspect of the present application, the battery module according to the fourth aspect of the present application, or the battery pack according to the fifth aspect of the present application.

DETAILED DESCRIPTION

The present application will be further elaborated below in conjunction with the accompanied drawings and embodiments. The embodiments as elaborated below and the accompanied drawings are used to exemplarily illustrate the principle of the present application, but cannot be used to limit the scope of the present application; thus, the present application is not limited to the embodiments as elaborated.

In the description of the present application, it should be noted that, unless otherwise specified, "plurality of" means two or more; the orientations or positional relationships indicated by the terms "upper", "lower", "left", "right", "inner", "outer", etc. are only for easy description of the present application and simplified description, rather than indicating or implying that the apparatuses or elements as described must have specific orientations or be constructed and operated in specific orientations, and thus should not be understood as limitation of the present application. In addition, terms "first", "second", "third", etc. are only for description purposes, but should not be understood as indicating or implying relative importance. "Vertical" is not strictly vertical, but is permitted to have allowable range of error. "Parallel" is not strictly parallel, but is permitted to have allowable range of error.

The orientation terms appearing in the following description all indicate directions shown in the drawings, but are not intended to limit specific structures of the present application. In the description of the present application, it should be noted that, unless otherwise specified and defined, terms "mounted", "coupled", and "connected" should be generally understood, for example, "connected" may be fixedly connected, detachably connected, integrally connected, directly connected, or indirectly connected via a medium. Those of ordinary skill in the field could understand the specific meanings of the above terms in the present application according to specific circumstances.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is comprised in the range. Thus, each point or single value, as the lower limit or upper limit of itself, can be combined with any other point or single value or combined with other lower limit or upper limit, to form a range that is not explicitly specified.

In the description herein, it should be noted that, unless otherwise specified, a numeric range described with the terms "no less than" and "no more than" comprises all numbers within that range including the endpoints, and "more" in "one or more" means two or more than two.

The above-stated summary of the invention is not intended to describe each embodiment or implementation disclosed in this application. The following description illustrates exemplary embodiments more specifically. In many places throughout the application, guidance is provided by means of a series of embodiments, which can be applied in various combinations. In each embodiment, the enumeration is only a representative group and should not be interpreted as exhaustive.

Herein below, the negative electrode active material and battery according to the present application will be described in detail.

First, the negative electrode active material according to the first aspect of the present application will be described.

The first aspect of the present application provides a negative electrode active material, comprising a core material and a polymer modified coating on at least part of a surface of the core material. The core material is one or more of a silicon-based negative electrode material and a tin-based negative electrode material. And the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere.

When a battery is charged for the first time, an SEI film will form on the surface of the negative electrode active material. Nevertheless, due to the relatively serious volume effect of the silicon-based negative electrode material and the tin-based negative electrode material, the SEI film on the surface of the negative electrode active material will be subjected to repeated breaking and repairing during charging and discharging of the battery. This will consume a large amount of active ions, thereby reducing Coulombic efficiency of the battery and increasing the irreversibility of active ions. In addition, under the condition that the SEI film on the surface of the negative electrode active material breaks, the exposed negative electrode active material would contact with the electrolyte directly, which may increase side reactions on the surface of the negative electrode active material. Moreover, the structure of the negative electrode active material would be damaged easily under the erosion of the electrolyte, which will accelerate the attenuation of battery capacity.

According to the present application, a polymer modified coating is applied on the surface of the silicon-based negative electrode material and the tin-based negative electrode material. The polymer modified coating according to the present application, as compared with the conventional inorganic carbon layer in the industry, has better elasticity and toughness and can better adapt to the expansion and contraction of the silicon-based negative electrode material and the tin-based negative electrode material during charging and discharging of the battery. Moreover, the polymer modified coating according to the present application ensures the formation of a more stable SEI film on the surface of the negative electrode active material, thereby avoiding the consumption of a large amount of active ions due to repeated breaking and repairing of the SEI film. In addition, it can also ensure that the SEI film could always isolate the negative electrode active material from the electrolyte and thus avoiding direct contact between there during the charging and discharging of the battery. Therefore, the side reaction on the surface of the negative electrode active material and the damage to the surface structure of the negative electrode active material due to the erosion of electrolyte are reduced, and thus the capacity loss of the battery is reduced.

In the negative electrode active material of the present application, the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere. The higher the weight loss rate the negative electrode active material is, the greater the coating amount of the negative electrode active material will be. Under the condition that the weight loss rate of the negative electrode active material is too large, the coating quality will become poor, and thus the negative electrode active material will have reduced gram capacity and is prone to agglomerate, so that the surface of the negative electrode active material will not be fully coated. During the charge and discharge cycle, due to the expansion of negative electrode active material particles, the agglomerated negative electrode active material particles will gradually disperse to expose a large area of uncoated fresh surface, which would accelerate the consumption of active ions; thus Coulombic efficiency of the battery reduces and cycle performance of the battery deteriorates.

Thus, the present application can reduce damage to the surface structure of the negative electrode active material during charging and discharging of the battery, reduce loss of active ions, and reduce capacity loss of the battery. Therefore, the present application can well improve the Coulombic efficiency and cycle performance of the battery.

In some embodiments, the negative electrode active material has a weight loss rate satisfying 0.3%≤weight loss rate≤1% in a thermogravimetric analysis test wherein the temperature is elevated from 25° C. to 800° C. under a non-oxidizing inert gas atmosphere.

Optionally, the non-oxidizing inert gas atmosphere is one or more selected from nitrogen, argon, and helium.

In some embodiments, the polymer-modified coating comprises nitrogen element and a —C=N— bond.

In some embodiments, the nitrogen element has a mass percentage of from 0.1% to 0.65% in the negative electrode active material; and optionally, the nitrogen element has a mass percentage of from 0.15% to 0.5% in the negative electrode active material.

Under the condition that the polymer modified coating comprises —C=N— bond, the polymer-modified coating can further have relatively high electrical conductivity and thus the electron conduction performance of the negative electrode active material improves, thereby benefiting the capacity of the negative electrode active material and the capacity retention during the cycle, constraining the increase of the impedance of the battery during charging and discharging cycle, and reducing polarization of the battery. As a result, the cycle performance of the battery is further improved.

In some embodiments, the silicon-based negative electrode material may be one or more selected from elemental silicon, a silicon-carbon composite, a silicon-oxygen compound, a silicon-nitrogen compound, and a silicon alloy; for example, the silicon-based negative electrode material may be selected from the silicon-oxygen compound. The theoretical gram capacity of the silicon-oxygen compound is about 7 times that of graphite. Furthermore, the silicon-oxygen compound, as compared with the elemental silicon, results in greatly reduced volume expansion during charging and greatly improved cycle stability of the battery.

In some embodiments, the tin-based negative electrode material may be one or more selected from elemental tin, a tin-oxygen compound, and a tin alloy.

In some embodiments, the negative electrode active material may have a volume particle size distribution width (Dv90-Dv10)/Dv50 of from 0.5 to 2.5; for example, the negative electrode active material may have a volume particle size distribution width (Dv90-Dv10)/Dv50 of from 0.8 to 2.0.

In some embodiments, the negative electrode active material may have a number particle size Dn10 of from 0.1 μm to 4 μm; for example, the negative electrode active material may have a number particle size Dn10 of from 0.17 μm to 3 μm; for another example, the negative electrode active material may have a number particle size Dn10 of from 0.2 μm to 1.5 μm.

In some embodiments, an X-ray diffraction spectrum of the negative electrode active material has a diffraction peak at the diffraction angle 2θ of from 19° to 27°, and optionally, the diffraction peak may have a full width at half maxima of from 4° to 12°; for example, the diffraction peak may have a full width at half maxima of from 5° to 10°. The negative electrode active material having the diffraction peak whose full width at half maxima falls within the above range from 4° to 12° at the position where the 2θ is from 19° to 27° has a relatively high gram capacity and a relatively low cycle expansion rate, and is unlikely to crack or pulverize during the charging and discharging cycle of the battery; thus, the cycle life of the battery can be further improved.

In some embodiments, the negative electrode active material has scattering peaks at the Raman shifts if from 1320 $cm^{-1}$ to 1410 $cm^{-1}$ and from 1550 $cm^{-1}$ to 1650 $cm^{-1}$ respectively in Raman scattering analysis. The Raman spectrum of the negative electrode active material has a D-band scattering peak of carbon (referred to as a D peak) at the Raman shift of from 1320 $cm^{-1}$ to 1410 $cm^{-1}$, and has a G-band scattering peak of carbon (referred to as a G peak) at the Raman shift of from 1550 $cm^{-1}$ to 1650 $cm^{-1}$. Optionally, a ratio of intensity $I_D$ of D peak to the intensity $I_G$ of G peak may be $1.60 \leq I_D/I_G \leq 2.50$; for example, the ratio of the intensity $I_D$ of D peak to intensity $I_G$ of G peak may be $1.80 \leq I_D/I_G \leq 2.40$.

Under the condition that the ratio of intensity $I_D$ of D peak to intensity $I_G$ of G peak falls within the above range, the irreversible capacity of the material during charging and discharging cycles may be reduced, and meanwhile the excellent electrical conductivity of the coating is ensured, the capacity of the material may perform beneficially, and the cyclic capacity retention of the material is improved. Thus, the initial Coulombic efficiency, cycle performance and energy density of the battery using the negative electrode active material are improved.

In some embodiments, the negative electrode active material may have a compaction density of from 1.1 $g/cm^3$ to 1.7 $g/cm^3$ measured under a pressure of 5 tons (equivalent to 49 KN); for example, the negative electrode active material may have a compaction density of from 1.2 $g/cm^3$ to 1.5 $g/cm^3$ measured under a pressure of 5 tons (equivalent to 49 KN).

In some embodiments, the polymer modified coating may further comprise sulfur element and a —C—S— bond and/or a —S—S— bond. The —C—S— bond enables the polymer-modified coating to have higher elasticity and toughness, thereby well adapting to the expansion and contraction of the silicon-based material and the tin-based material during lithiation and delithiation; the —S—S— bond enables the polymer-modified coating to have higher active ion conductivity, thereby better improving the cycle performance of the battery.

The second aspect of the present application provides a process for preparing a negative electrode active material, comprising the following steps: step S01, dissolving a polymer precursor in a solvent, and stirring until uniform dispersion, to obtain a solution of the polymer precursor; step S02, adding a core material into the solution of the polymer precursor, and stirring, to obtain a mixed slurry, wherein the core material is one or more selected from a silicon-based negative electrode material and a tin-based negative electrode material; step S03, transferring the mixed slurry to a spray dryer, and performing spray drying under a non-oxidizing inert gas atmosphere, to obtain a solid powder; and step S04, performing heat treatment on the solid powder of step S03 under the non-oxidizing inert gas atmosphere at a certain temperature for a period of time, to obtain the negative electrode active material.

Compared with traditional wet coating, the negative electrode active material is coated more uniformly, less agglomerated, and has a higher preparation efficiency during spray drying preparation. When the negative electrode active material is prepared by the traditional wet coating, the traditional wet coating process is the same as the process for preparing the negative electrode active material of the present application with the exception that step S03 should be: placing the mixed slurry of step S02 in a wet coating machine, and drying under a non-oxidizing inert gas atmosphere, to obtain solid powder.

In step S01, the polymer precursor may be one or more selected from polystyrene, phenolic resin, melamine resin, polyacrylamide, polyvinyl chloride, polyimide, polyphenylene, polyacrylonitrile, polyaniline, and polyvinylidene chloride; for example, the polymer precursor may be one or more selected from polyimide, polyacrylonitrile, polyaniline, and polyacrylamide.

In step S02, the solvent may be one or more selected from water, N-methyl pyrrolidone, toluene, xylene, and dimethylformamide.

In step S03, the polymer precursor may have a weight-average molecular weight of from 50,000 to 200,000; for example, the polymer precursor may have a weight-average molecular weight of from 60,000 to 150,000.

In step S01, optionally, a ratio of the mass of the polymer precursor to the volume of the solvent is from 0.1 g/L to 20 g/L; for example, a ratio of the mass of the polymer precursor to the volume of the solvent may be from 0.5 g/L to 10 g/L.

In step S02, optionally, a mass ratio of the core material to the polymer precursor is from 7 to 180; for example, a mass ratio of the core material to the polymer precursor may be from 12 to 100. Under the condition that the addition amount of the polymer precursor is too large, the negative electrode active material will have increased weight loss rate in the thermogravimetric analysis test, and have the too large amount of coating accordingly. Thus, the negative electrode active material is prone to agglomerate during preparation, which in turn affects the conduction of active ions during charging and discharging. As a result, the cycle performance of the battery deteriorates. Under the condition that the addition of the polymer precursor is too small, it will be difficult to achieve the effects of uniform coating and isolating electrolyte erosion.

In step S03, optionally, the non-oxidizing inert gas atmosphere is one or more selected from nitrogen, argon, and helium.

In step S03, optionally, the spray drying is carried out under a temperature of from 80° C. to 250° C.; for example, the spray drying may be carried out under a temperature of from 110° C. to 200° C. The heating rate may be from 1° C./min to 10° C./min, for example, the heating rate may be from 1° C./min to 5° C./min.

In step S04, optionally, the non-oxidizing inert gas atmosphere is one or more selected from nitrogen, argon, and helium.

In step S04, optionally, the heat treatment may be carried out under a temperature of from 250° C. to 450° C.; for example, the heat treatment may be carried out under a temperature of from 300° C. to 450° C. Under the condition that the heat treatment temperature is too high or too low, the polymer modified coating tends to become completely carbonized; as a result, the weight loss rate of the material cannot meet the above requirements. Moreover, the polymer modified coating has deteriorated elasticity and toughness, and thus cannot adapt to the expansion and contraction of the silicon-based negative electrode material and the tin-based negative electrode material during charging and discharging, and cannot ensure the isolation of the surface of the negative electrode active material from the electrolyte, thereby resulting in poor cycle performance of the battery.

In step S04, optionally, the heat treatment may be carried out for from 2 h to 8 h; for example, the heat treatment may be carried out for from 3 h to 5 h.

In step S04, the above process may further optionally comprise: mixing the solid powder with a certain mass of sulfur powder and then performing heat treatment. A mass ratio of the sulfur powder to the polymer precursor may be from 1 to 5; for example, a mass ratio of the sulfur powder to the polymer precursor may be from 2 to 4.

Next, a battery according to the third aspect of the present application will be described.

The third aspect of the present application provides a battery, comprising a positive electrode plate, a negative electrode plate, a separator, an electrolyte, etc. The negative electrode plate may comprise a negative electrode current collector and a negative electrode film disposed on at least one surface of the negative electrode current collector and comprising the negative electrode active material according to the first aspect of the present application. The negative electrode film may be disposed on one surface of the negative electrode current collector or on two surfaces of the negative electrode current collector. In addition to the negative electrode active material according to the first aspect of the present application, the negative electrode film may further comprise other negative electrode active materials, such as a carbon material. Optionally, the carbon material is one or more selected from graphite, soft carbon, and hard carbon. The negative electrode film may further comprise a conductive agent and a binder whose type and content are not specifically limited, and may be selected according to actual requirements. The type of the negative electrode current collector is also not specifically limited, and may be selected according to actual requirements.

In the battery of the present application, the positive electrode plate may comprise a positive electrode current collector and a positive electrode film disposed on at least one surface of the positive electrode current collector and comprising a positive electrode active material. The positive electrode film may be disposed on one surface of the positive electrode current collector or on two surfaces of the positive electrode current collector. The positive electrode film may further comprise a conductive agent and a binder whose type and content are not specifically limited, and may be selected according to actual requirements. The type of the positive electrode current collector is also not specifically limited, and may be selected according to actual requirements.

It should be noted that the battery according to the third aspect of the present application may be a lithium ion battery, a sodium ion battery, or any other battery that uses the negative electrode active material according to the first aspect of the present application.

When the battery is a lithium ion battery, the positive electrode active material may be selected from lithium cobalt oxides, lithium nickel oxides, lithium manganese oxides, lithium nickel manganese oxides, lithium nickel cobalt manganese oxides, lithium nickel cobalt aluminum oxides, lithium-containing phosphates with an olivine structure, etc., but the present application is not limited to these materials, what can also be used are other well-known traditional materials that can be used as positive electrode active materials for lithium ion batteries. These positive electrode active materials may be used alone, or be used in combination of two or more. Optionally, the positive electrode active material may be one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP), and $LiMnPO_4$.

When the battery is a sodium ion battery, the positive electrode active material may be selected from a transition metal oxide $Na_xMO_2$, where M is a transition metal and may be one or more selected from Mn, Fe, Ni, Co, V, Cu, and Cr, and $0<x\leq 1$; a polyanionic material, which may be selected from phosphate, fluorophosphate, pyrophosphate, or sulfate; a Prussian blue material, etc. Nevertheless, the present application is not limited to these materials, what may also be used in the present application are other well-known traditional materials that can be used as positive electrode active materials for sodium ion batteries. These positive electrode active materials may be used alone, or two or more of them may be used in combination. Optionally, the positive electrode active material is one or more selected from $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, a Prussian blue material, and materials having a general formula $A_aM_b(PO_4)_cO_xY_{3-x}$ (where A is one or more selected from $H^+$, $Li^+$, $Na^+$, $K^+$, and $NH_4^+$; M is a transition metal cation that may be one or more selected from V, Ti, Mn, Fe, Co, Ni, Cu, and Zn; Y is a halogen anion that may be one or more selected from F, Cl, and Br; and $0<a\leq 4$, $0<b\leq 2$, $1\leq c\leq 3$, and $0\leq x\leq 2$).

In the battery of the present application, the separator is disposed between the positive electrode plate and the negative electrode plate for separation. The type of the separator is not specifically limited, and may be any separator material used in existing batteries, such as polyethylene, polypropylene, polyvinylidene fluoride and a multi-layer composite film thereof, but is not limited to these materials.

In the battery of the present application, the type of the electrolyte is not specifically limited. The electrolyte may be a liquid electrolyte, which is also referred to as an electrolytic solution, and the electrolyte may also be a solid electrolyte. Optionally, the electrolyte is a liquid electrolyte. The liquid electrolyte may comprise an electrolyte salt and an organic solvent. The specific types of the electrolyte salt and the organic solvent are not specifically limited, and may be selected according to actual requirements. The electrolyte may further comprise additives. The types of additives are not particularly limited, and may be negative electrode film-forming additives, positive electrode film-forming additives, or additives that can improve some performance of batteries, such as additives that improve overcharge performance of batteries, additives that improve high-temperature performance of batteries, and additives that improve low-temperature performance of batteries.

In some embodiments, the battery may comprise an outer package. The outer package is used for packaging the positive electrode plate, the negative electrode plate, and the electrolyte.

In some embodiments, the outer package of the battery may be a hard case, such as a hard plastic case, an aluminum case, a steel case, etc. The outer package of the battery may also be a soft bag, such as a pouch type soft bag. The material of the soft bag may be plastic, such as one or more of polypropylene (PP), polybutylene terephthalate (PBT), polybutylene succinate (PBS), etc.

The battery of the present application may be prepared by methods known in the field. For example, it may be prepared by winding or laminating the positive electrode plate, the separator, and the negative electrode plate to form an electrode assembly, wherein the separator is located between the positive electrode plate and the negative electrode plate for separation; and placing the electrode assembly in an outer package, injecting an electrode, and sealing, to obtain a battery.

Figure 1:
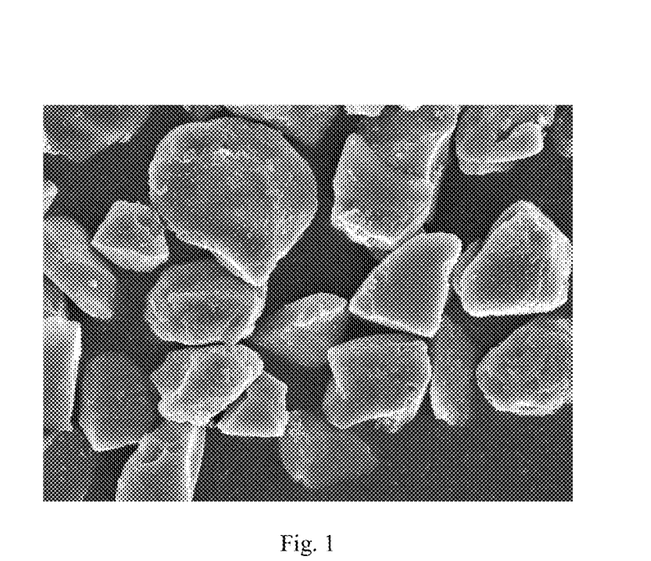
FIG. 1 is an SEM (Scanning Electron Microscope) image of a negative electrode active material according to one embodiment of the present application.
Figure 2:
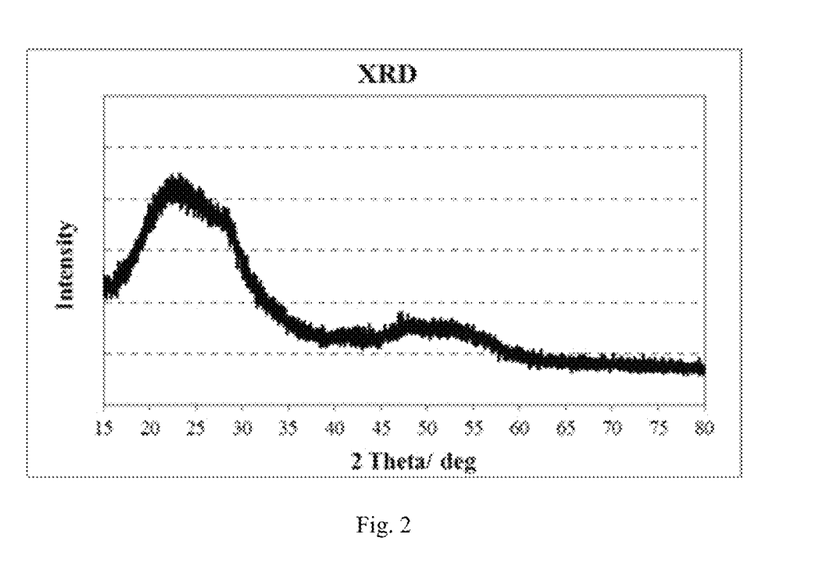
FIG. 2 shows a diffraction peak in an X-ray diffraction spectrum of the negative electrode active material according to one embodiment of the present application.
Figure 3:
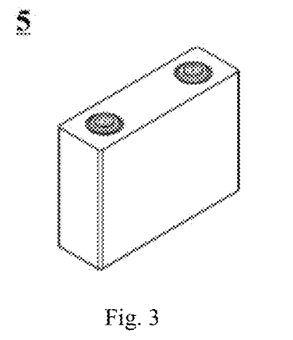
FIG. 3 is a schematic diagram of a battery according to one embodiment.

The present application does not have specific limitation on the shape of the battery. The battery may be cylindrical, square, or in other arbitrary shape. FIG. 3 shows a battery 5 of a square structure as an example.

Figure 4:
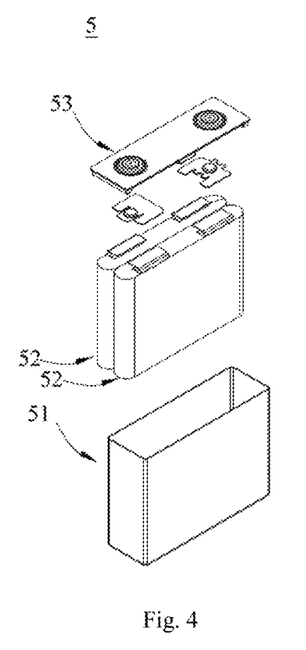
FIG. 4 is an exploded view of FIG. 3.

In some embodiments, referring to FIG. 4, the outer package may comprise a shell 51 and a cover plate 53. The shell 51 may comprise a bottom plate and side plates connected to the bottom plate, wherein the bottom plate and the side plates are united to form a receiving cavity. The shell 51 has an opening communicated with the receiving cavity, and the cover plate 53 can cover the opening to close the receiving cavity. The positive electrode plate, the negative electrode plate and the separator may be wound or laminated to form an electrode assembly 52. The electrode assembly 52 is packaged in the receiving cavity, which electrolyte infiltrates the electrode assembly 52. The battery 5 comprises one or more electrode assemblies 52, which can be adjusted according to requirements.

The fourth aspect of the present application provides a battery module. The battery provided in the third aspect of the present application can be assembled into the battery module in the fourth aspect of the present application. The battery module may comprise a plurality of batteries, and the specific number can be adjusted according to the application and capacity of the battery module.

Figure 5:
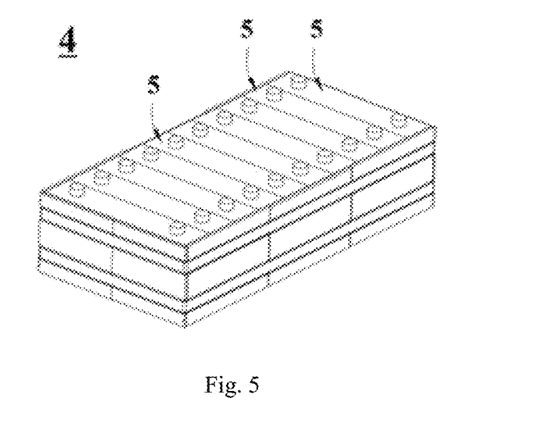
FIG. 5 is a schematic diagram of a battery module according to one embodiment.

FIG. 5 shows a battery module 4 as an example. Referring to FIG. 5, in the battery module 4, a plurality of batteries 5 may be arranged sequentially in a length direction of the battery module 4. Of course, they may also be arranged in any arbitrary way. Furthermore, a plurality of batteries 5 can be fixed by fasteners.

Optionally, the battery module 4 may further comprise a housing having a receiving space, with a plurality of batteries 5 received in the receiving space.

The fifth aspect of the present application provides a battery pack. The battery module provided in the fourth aspect of the present application can also be assembled into the battery pack. The number of battery modules comprised in the battery pack can be adjusted according to the application and capacity of the battery pack.

Figure 6:
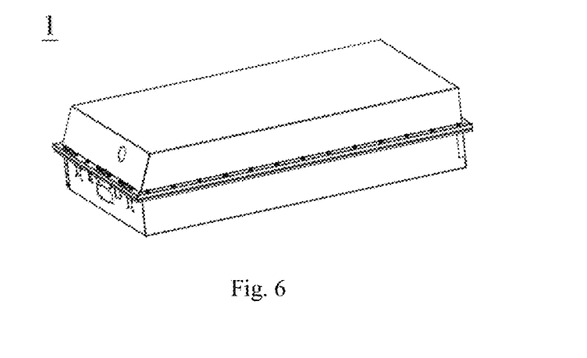
FIG. 6 is a schematic diagram of a battery pack according to one embodiment.
Figure 7:
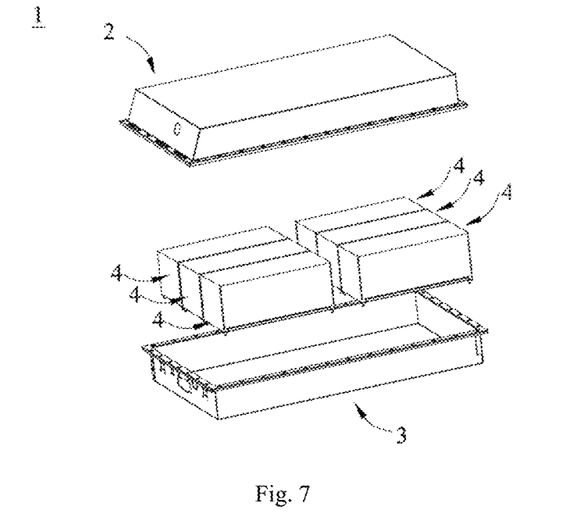
FIG. 7 is an exploded view of FIG. 6.

FIGS. 6 and 7 show a battery pack 1 as an example. Referring to FIGS. 6 and 7, the battery pack 1 may comprise a battery case and a plurality of battery modules 4 disposed in the battery case. The battery case comprises an upper case body 2 and a lower case body 3. The upper case body 2 may cover the lower case body 3 to form a closed space for receiving the battery modules 4. A plurality of battery modules 4 may be arranged in the battery case in any arbitrary manner.

The sixth aspect of the present application provides an apparatus, comprising at least one of the secondary battery, the battery module, or the battery pack described in the present application. The secondary battery, the battery module, or the battery pack may be used as a power source for the apparatus, and may also be used as an energy storage unit for the apparatus. The apparatus may be, but is not limited to, a mobile device (e.g., a mobile phone, a laptop, etc.), an electric vehicle (e.g., a pure electric vehicle, a hybrid electric vehicle, a plug-in hybrid electric vehicle, an electric bicycle, an electric scooter, an electric golf vehicle, and an electric truck), an electric train, a ship, a satellite, an energy storage system, etc.

The secondary battery, the battery module, or the battery pack used in the apparatus may be selected according to requirements for using.

Figure 8:
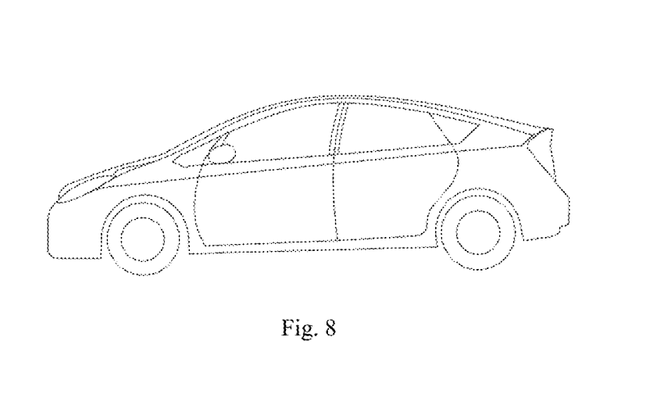
FIG. 8 is a schematic diagram of an apparatus according to one embodiment.

FIG. 8 shows an apparatus as an example. The apparatus is a pure electric vehicle, a hybrid electric vehicle, or a plug-in hybrid electric vehicle, etc. In order to meet the requirements of the apparatus for high power and high energy density of the secondary battery, a battery pack or a battery module may be used.

As another example, the apparatus may be a mobile phone, a tablet computer, a laptop, etc. The apparatus is generally required to be thin and light, and thus the secondary battery can be used as a power source.

Hereinafter, the present application will be further explained in conjunction with examples. It should be understood that these examples are only used to illustrate the present application, but not to limit the scope of the present application.

Example 1

Firstly, a negative electrode active material was prepared by:
(1) weighing 1 g of polyacrylonitrile and adding the same into 1000 mL of dimethylformamide solvent, and stirring until all the polyacrylonitrile dissolved;
(2) weighing 100 g of silicon oxide and adding the same into the solution obtained in step (1), and stirring, to obtain a mixed slurry;
(3) transferring the mixed slurry to a spray dryer, introducing argon, and performing spray drying at 190° C., to obtain a solid powder; and
(4) performing heat treatment on the obtained solid powder under a argon atmosphere at a temperature of 450° C. for 4 h, and cooling, to obtain the required negative electrode active material.

Next, the prepared negative electrode active material was mixed with artificial graphite at a mass ratio of 3:7 to obtain a mixture of negative electrode active material and artificial graphite, then the mixture of the negative electrode active material and artificial graphite was mixed with Super P as a conductive agent, sodium carboxymethyl cellulose (CMC) as a thickener and styrene-butadiene rubber (SBR) as a binder at a mass ratio of 88:3:3:6, then deionized water as a solvent was added, and the system was stirred by a vacuum mixer until uniform, to obtain a slurry. The slurry was uniformly applied on a copper foil as a negative electrode current collector, then the copper foil coated with the slurry is transferred into a vacuum drying box for complete drying. And then the copper foil coated with the slurry after drying was rolled and punched to obtain a small wafer with certain area.

Afterwards, a button battery was obtained by assembling a lithium metal sheet as a counter electrode and Celgard 2400 as a separator, and injecting an electrolytic solution.

The electrolyte was obtained as follows: uniformly mixing ethylene carbonate (EC), dimethyl carbonate (DMC) and diethyl carbonate (DEC) at a volume ratio of 1:1:1 to obtain an organic solvent; and dissolving $LiPF_6$ in the organic solvent and adding fluoroethylene carbonate (FEC) as an additive, wherein $LiPF_6$ had a concentration of 1 mol/L, and the FEC had a mass percentage of 6% in the electrolytic solution.

Button batteries of Examples 2-15 and Comparative Examples 1-4 were prepared by the same process as that of Example 1, and specific differences were shown in Table 1.

TABLE 1

Preparation parameters of negative electrode active materials of Examples 1-15 and Comparative Examples 1-4

| | Core material | | Polymer precursor | | Solvent | | Spray drying temperature ° C. | Heat treatment temperature ° C. | Heat treatment time h |
|---|---|---|---|---|---|---|---|---|---|
| | Type | Mass g | Type | Mass g | Type | Volume mL | | | |
| Example 1 | Silicon oxide | 100 | Polyacrylonitrile | 1 | Dimethylformamide | 1000 | 190 | 450 | 4 |
| Example 2 | Silicon oxide | 100 | Polyacrylonitrile | 1.7 | Dimethylformamide | 1000 | 190 | 450 | 4 |
| Example 3 | Silicon oxide | 100 | Polyacrylonitrile | 2 | Dimethylformamide | 1000 | 190 | 450 | 4 |
| Example 4 | Silicon oxide | 100 | Polyacrylonitrile | 2.5 | Dimethylformamide | 1000 | 190 | 450 | 4 |
| Example 5 | Silicon oxide | 100 | Polyacrylonitrile | 3.5 | Dimethylformamide | 1000 | 190 | 450 | 4 |
| Example 6 | Silicon oxide | 100 | Polyacrylonitrile | 4 | Dimethylformamide | 1000 | 190 | 450 | 4 |
| Example 7 | Silicon oxide | 100 | Polyacrylonitrile | 4.8 | Dimethylformamide | 1000 | 190 | 450 | 4 |
| Example 8 | Silicon oxide | 100 | Polyacrylonitrile | 6 | Dimethylformamide | 1000 | 190 | 450 | 4 |
| Example 9 | Silicon oxide | 100 | Polyaniline | 5 | N-methyl pyrrolidone | 1000 | 240 | 370 | 3.5 |
| Example 10 | Silicon oxide | 100 | Polyimide | 3 | Dimethylformamide | 1000 | 200 | 315 | 3 |
| Example 11 | Silicon oxide | 100 | Polyacrylamide | 6 | Water | 1000 | 130 | 310 | 4.5 |
| Example 12 | Silicon oxide | 100 | Polyacrylonitrile | 4 | Dimethylformamide | 1000 | 190 | 450 | 4 |
| Example 13 | Silicon oxide | 100 | Polyacrylonitrile | 4 | Dimethylformamide | 1000 | 190 | 450 | 4 |
| Example 14 | Silicon oxide | 100 | Polyacrylonitrile | 4 | Dimethylformamide | 1000 | 190 | 450 | 4 |
| Example 15 | Silicon oxide | 100 | Polyacrylonitrile | 4 | Dimethylformamide | 1000 | 190 | 450 | 4 |
| Comparative Example 1 | Silicon oxide | 100 | Polyacrylonitrile | 4 | Dimethylformamide | 1000 | 190 | / | / |
| Comparative Example 2 | Silicon oxide | 100 | Polyacrylonitrile | 4 | Dimethylformamide | 1000 | 190 | 1200 | 4 |
| Comparative Example 3 | Silicon oxide | 100 | Polyacrylonitrile | 0.5 | Dimethylformamide | 1000 | 190 | 450 | 4 |
| Comparative Example 4 | Silicon oxide | 100 | Polyacrylonitrile | 15 | Dimethylformamide | 1000 | 190 | 450 | 4 |

Next, performance tests of the negative electrode active material and the button battery were described.

(1) Weight Loss Rate Test of the Negative Electrode Active Material

The weight loss rate of the prepared negative electrode active material was measured by thermogravimetric analysis, wherein the test was conducted in a temperature range from 25° C. to 800° C under a nitrogen atmosphere.

(2) Initial Coulombic Efficiency and Cycle Performance Test of the Button Battery The button battery was discharged at a constant current rate of 0.1C to a voltage of 0.005 V and then was discharged at a constant current rate of 0.05C to the voltage of 0.005 V at 25° C. under normal pressure environment, and the specific discharge capacity at this time was recorded as the initial lithiation capacity. Then, the button battery was charged at the constant current rate of 0.1C to a voltage of 1.5 V, and the specific charge capacity at this time was recorded as the initial delithiation capacity. The button battery was subjected to 50 cycles of charging and discharging test according to the above method, and the delithiation capacity for each cycle was recorded.

Initial coulombic efficiency of the negative electrode active material (%)=initial delithiation capacity/initial lithiation capacity×100%

Cycle capacity retention rate of the negative electrode active material (%)=the delithiation capacity at 50$^{th}$ cycle/initial delithiation capacity×100%

TABLE 2

Performance test results of Examples 1-15 and Comparative Examples 1-4

| | Negative electrode active material | | | | | | Button battery | |
|---|---|---|---|---|---|---|---|---|
| | Is there a —C=N— bond | Nitrogen content | Dn10 | (Dv90 − Dv10)/Dv50 | $I_D/I_G$ | Weight loss rate | Initial Coulombic efficiency | capacity retention rate after 50 cycles |
| Example 1 | Yes | 0.13 | 0.58 | 1.26 | 1.85 | 0.24% | 79.1% | 93.6% |
| Example 2 | Yes | 0.17 | 0.59 | 1.24 | 1.88 | 0.42% | 81.8% | 97.3% |
| Example 3 | Yes | 0.21 | 0.57 | 1.26 | 1.92 | 0.55% | 83.0% | 98.4% |
| Example 4 | Yes | 0.23 | 0.56 | 1.25 | 1.86 | 0.67% | 82.5% | 98.2% |
| Example 5 | Yes | 0.32 | 0.58 | 1.23 | 1.95 | 0.84% | 81.5% | 96.2% |
| Example 6 | Yes | 0.41 | 0.58 | 1.24 | 1.94 | 0.96% | 80.5% | 95.9% |
| Example 7 | Yes | 0.52 | 0.59 | 1.27 | 1.90 | 1.24% | 79.4% | 95.8% |
| Example 8 | Yes | 0.61 | 0.58 | 1.25 | 1.97 | 1.87% | 76.9% | 91.7% |
| Example 9 | Yes | 0.31 | 0.58 | 1.26 | 1.95 | 1.37% | 77.3% | 89.4% |
| Example 10 | Yes | 0.18 | 0.58 | 1.26 | 2.18 | 0.92% | 76.6% | 91.2% |
| Example 11 | Yes | 0.51 | 0.58 | 1.26 | 2.16 | 1.28% | 78.5% | 90.4% |
| Example 12 | Yes | 0.39 | 0.20 | 1.30 | 1.96 | 0.94% | 79.2% | 94.3% |
| Example 13 | Yes | 0.41 | 1.50 | 1.31 | 1.95 | 0.96% | 82.9% | 96.8% |
| Example 14 | Yes | 0.42 | 2.50 | 1.24 | 2.02 | 0.95% | 82.1% | 95.7% |
| Example 15 | Yes | 0.4 | 4.00 | 1.26 | 2.05 | 0.497% | 82.5% | 94.9% |
| Comparative Example 1 | No | 0.39 | 0.58 | 1.26 | / | 2.65% | 73.7% | 89.1% |

TABLE 2-continued

Performance test results of Examples 1-15 and Comparative Examples 1-4

| | Negative electrode active material | | | | | | Button battery | |
|---|---|---|---|---|---|---|---|---|
| | Is there a —C=N— bond | Nitrogen content | Dn10 | (Dv90 − Dv10)/Dv50 | $I_D/I_G$ | Weight loss rate | Initial Coulombic efficiency | capacity retention rate after 50 cycles |
| Comparative Example 2 | No | 0.4 | 0.59 | 1.24 | 1.33 | 0.02% | 74.4% | 89.3% |
| Comparative Example 3 | Yes | 0.06 | 0.57 | 1.26 | 1.85 | 0.11% | 72.4% | 89.7% |
| Comparative Example 4 | Yes | 1.26 | 0.56 | 1.25 | 2.08 | 4.32% | 70.9% | 84.4% |

From the test results shown in Table 2, it can be seen that the button batteries prepared in Examples 1-15 had improved initial coulombic efficiency and cycle performance.

A conventional polymer coating was used in Comparative Example 1, and the button battery had relatively low initial Coulombic efficiency and poor cycle performance since the insulating property of the polymer itself would negatively affect the conduction of lithium ions during charging and discharging.

In Comparative Example 2, the polymer precursor was heat-treated under a high temperature of 1200° C., and thus the polymer was almost completely carbonized so that the polymer coating on the surface of the silicon-oxygen compound was almost an inorganic carbon layer. Because the negative electrode active material had very low the weight loss rate, the side reaction of the negative electrode active material was significant, and thus the cycle performance of the button battery was poor. In addition, the inorganic carbon layer had poor elasticity and toughness, and thus could not well adapt to the expansion and contraction of the silicon-oxygen compound during charging and discharging, resulting in repeated breakage and repair of the SEI film on the surface of the negative electrode active material. This would consume a large amount of lithium ions on the one hand, and on the other hand, the exposed negative electrode active material would be in direct contact with the electrolytic solution and the side reaction on the surface of the negative electrode active material would increase accordingly. Therefore, the cycle performance of the button battery would further deteriorate.

The negative electrode active material prepared in Comparative Example 3 had overly low weight loss rate, and thus it was difficult for the coating to achieve the effects of uniform coating and isolating electrolyte erosion, so that the initial coulombic efficiency of the button battery was relatively low. Meanwhile, the coating also had poor elasticity and toughness, and thus could not well adapt to the expansion and contraction of the silicon-oxygen compound during charging and discharging, resulting in repeated breakage and repair of the SEI film on the surface of the negative electrode active material. This will consume a large amount of lithium ions on the one hand, and on the other hand, the exposed negative electrode active material would be in direct contact with the electrolytic solution and the side reaction on the surface of the negative electrode active material would increase accordingly. Therefore, the cycle performance of the button battery was also poor.

The negative electrode active material prepared in Comparative Example 4 had an overly high weight loss rate, and thus the negative electrode active material was prone to agglomeration. This resulted in uncompleted coating of the surface of the negative electrode active material. During the charging and discharging cycle of the button battery, the negative electrode active material particles would expand, thus the agglomerated negative electrode active material particles would gradually disperse to expose a large area of uncoated fresh surface; the consumption of lithium ions would be accelerated accordingly. Therefore, the cycle performance of the button battery was also poor.

Some exemplary embodiments of the present invention are provided as follows.

Embodiment 1

A negative electrode active material, comprising a core material and a polymer modified coating on at least part of a surface of the core material;
wherein the core material is one or more of a silicon-based negative electrode material and a tin-based negative electrode material; and
wherein the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere.

Embodiment 2

The negative electrode active material according to claim 1, wherein the weight loss rate satisfies 0.3%≤weight loss rate≤1%.

Embodiment 3

The negative electrode active material according to any one of embodiment 1 or 2, wherein the polymer modified coating comprises nitrogen element and a —C=N— bond.

Embodiment 4

The negative electrode active material according to any one of embodiments 1 to 3, wherein the nitrogen element has a mass percentage of from 0.1% to 0.65% in the negative electrode active material; and optionally, the nitrogen element has a mass percentage of from 0.15% to 0.5% in the negative electrode active material.

Embodiment 5

The negative electrode active material according to any one of embodiments 1 to 4, wherein the polymer modified coating comprises sulfur element and a —C—S— bond and/or a —S—S— bond.

Embodiment 6

The negative electrode active material according to any one of embodiments 1 to 5, wherein the negative electrode active material has a volume particle size distribution width (Dv90-Dv10)/Dv50 of from 0.5 to 2.5; and optionally, the negative electrode active material has a volume particle size distribution width (Dv90-Dv10)/Dv50 of from 0.8 to 2.0.

Embodiment 7

The negative electrode active material according to any one of embodiments 1 to 6, wherein the negative electrode active material has a number particle size Dn10 of from 0.17 μm to 3 μm; and optionally, the negative electrode active material has a number particle size Dn10 of from 0.2 μm to 1.5 μm.

Embodiment 8

The negative electrode active material according to any one of embodiments 1 to 7, wherein an X-ray diffraction spectrum of the negative electrode active material has a diffraction peak whose full width at half maxima is from 4° to 12° at the diffraction angle 2θ of from 19° to 27°; and optionally, the full width at half maxima is from 5° to 10°.

Embodiment 9

The negative electrode active material according to any one of embodiments 1 to 8, wherein a Raman spectrum of the negative electrode active material has scattering peaks at positions where Raman shifts are from 1320 $cm^{-1}$ to 1410 $cm^{-1}$ and from 1550 $cm^{-1}$ to 1650 $cm^{-1}$ respectively, wherein the scattering peak at the position where the Raman shift is from 1320 $cm^{-1}$ to 1410 $cm^{-1}$ has an intensity denoted as $I_D$, and the scattering peak at the position where the Raman shift is from 1550 $cm^{-1}$ to 1650 $cm^{-1}$ has an intensity denoted as IG, and wherein ID and IG satisfy 1.60 has an intensity denoted as IG, and wherein ID and IG satisfy 1.60itio

Embodiment 10

The negative electrode active material according to any one of embodiments 1 to 9, wherein the negative electrode active material has a compaction density of from 1.1 $g/cm^3$ to 1.7 $g/cm^3$ measured under a pressure of 5 tons (equivalent to 49 KN); and optionally, the negative electrode active material has a compaction density of from 1.2 $g/cm^3$ to 1.5 $g/cm^3$ measured under a pressure of 5 tons (equivalent to 49 KN).

Embodiment 11

The negative electrode active material according to any one of embodiments 1 to 10, wherein
the silicon-based negative electrode material is one or more selected from elemental silicon, a silicon-carbon compound, a silicon-oxygen compound, a silicon-nitrogen compound, and a silicon alloy; and
the tin-based negative electrode material is one or more selected from elemental tin, a tin-oxygen compound, and a tin alloy.

Embodiment 12

The negative electrode active material according to any one of embodiments 1 to 11, wherein the silicon-based negative electrode material is selected from the silicon-oxygen compound.

Embodiment 13

A process for preparing the negative electrode active material according to any one of embodiments 1 to 12, comprising steps of:
dissolving a polymer precursor in a solvent, and stirring until uniform dispersion, to obtain a solution of the polymer precursor;
adding a core material into the solution of the polymer precursor, and stirring, to obtain a mixed slurry, wherein the core material is one or more selected from a silicon-based negative electrode material and a tin-based negative electrode material;
placing the mixed slurry in a spray dryer or a wet coating machine, and drying it under an non-oxidizing inert gas atmosphere, to obtain a solid powder; and
performing heat treatment to the solid powder under a non-oxidizing inert gas atmosphere at a temperature of from 200° C. to 450° C., to obtain the negative electrode active material;
wherein the negative electrode active material comprises the core material and a polymer-modified coating on at least a part of a surface of the core material; the core material is one or more of a silicon-based negative electrode material and a tin-based negative electrode material; and the negative electrode active material has a weight loss rate satisfying 0.2%≤weight loss rate≤2% in a thermogravimetric analysis test wherein the temperature is elevated from 25 elevated from 25 and a polymer-mg inert gas atmosphere.

Embodiment 14

A battery, comprising the negative electrode active material according to any one of embodiments 1 to 12 or the negative electrode active material obtained by the process according to embodiment 13.

Embodiment 15

A battery module, comprising the battery according to embodiment 14.

Embodiment 16

A battery pack, comprising the battery module according to embodiment 15.

Embodiment 17

An apparatus, comprising at least one of the battery according to embodiment 14, the battery module according to embodiment 15, or the battery pack according to embodiment 16.

Based on the disclosure and teaching of the foregoing description, those skilled in the field can also make changes and modifications to the foregoing embodiments. Therefore, this application is not limited to the specific embodiments disclosed and described above, and some modifications and changes to this application should also fall within the protection scope of the claims of this application. In addition, some specific terms are used in this specification, which are only for convenience of description and do not constitute any limitation to this application.

What is claimed is:

1. A negative electrode active material, comprising a core material and a polymer modified coating on at least part of a surface of the core material;
wherein the core material is one or more of a silicon-based negative electrode material and a tin-based negative electrode material; and
wherein the negative electrode active material has a weight loss rate satisfying 0.2%≤weight loss rate≤2% in a thermogravimetric analysis test wherein temperature is elevated from 25° C. to 800° C. under a non-oxidizing inert gas atmosphere.

2. The negative electrode active material according to claim 1, wherein the weight loss rate satisfies 0.3%≤weight loss rate≤1%.

3. The negative electrode active material according to claim 1, wherein the polymer modified coating comprises nitrogen element and a —C=N— bond.

4. The negative electrode active material according to claim 3, wherein the nitrogen element has a mass percentage of from 0.1% to 0.65% in the negative electrode active material.

5. The negative electrode active material according to claim 4, wherein the nitrogen element has a mass percentage of from 0.15% to 0.5% in the negative electrode active material.

6. The negative electrode active material according to claim 1, wherein the polymer modified coating comprises sulfur element and a —C—S— bond and/or a —S—S— bond.

7. The negative electrode active material according to claim 1, wherein the negative electrode active material has a volume particle size distribution width (Dv90-Dv10)/Dv50 of from 0.5 to 2.5.

8. The negative electrode active material according to claim 7, wherein the negative electrode active material has a volume particle size distribution width (Dv90-Dv10)/Dv50 of from 0.8 to 2.0.

9. The negative electrode active material according to claim 1, wherein the negative electrode active material has a number particle size Dn10 of from 0.17 μm to 3 μm.

10. The negative electrode active material according to claim 9, wherein the negative electrode active material has a number particle size Dn10 of from 0.2 μm to 1.5 μm.

11. The negative electrode active material according to claim 1, wherein an X-ray diffraction spectrum of the negative electrode active material has a diffraction peak whose full width at half maxima is from 4° to 12° at the diffraction angle 2θ of from 19° to 27°.

12. The negative electrode active material according to claim 11, wherein the full width at half maxima is from 5° to 10°.

13. The negative electrode active material according to claim 1, wherein a Raman spectrum of the negative electrode active material has scattering peaks at positions where Raman shifts are from 1320 $cm^{-1}$ to 1410 $cm^{-1}$ and from 1550 $cm^{-1}$ to 1650 $cm^{-1}$ respectively, wherein the scattering peak at the position where the Raman shift is from 1320 $cm^{-1}$ to 1410 $cm^{-1}$ has an intensity denoted as $I_D$, and the scattering peak at the position where the Raman shift is from 1550 $cm^{-1}$ to 1650 $cm^{-1}$ has an intensity denoted as $I_G$ and wherein $I_D$ and $I_G$ satisfy 1.60≤$I_D/I_G$≤2.50.

14. The negative electrode active material according to claim 13, wherein the $I_D$ and $I_G$ satisfy 1.80≤$I_D/I_G$≤2.40.

15. The negative electrode active material according to claim 1, wherein the negative electrode active material has a compaction density of from 1.1 $g/cm^3$ to 1.7 $g/cm^3$ measured under a pressure of 5 tons (equivalent to 49 KN).

16. The negative electrode active material according to claim 15, wherein the negative electrode active material has a compaction density of from 1.2 $g/cm^3$ to 1.5 $g/cm^3$ measured under a pressure of 5 tons (equivalent to 49 KN).

17. The negative electrode active material according to claim 1, wherein the silicon-based negative electrode material is one or more selected from elemental silicon, a silicon-carbon compound, a silicon-oxygen compound, a silicon-nitrogen compound, and a silicon alloy; and
the tin-based negative electrode material is one or more selected from elemental tin, a tin-oxygen compound, and a tin alloy.

18. The negative electrode active material according to claim 1, wherein the silicon-based negative electrode material is selected from the silicon-oxygen compound.

19. A process for preparing the negative electrode active material according to claim 1, comprising steps of:
dissolving a polymer precursor in a solvent, and stirring until uniform dispersion, to obtain a solution of the polymer precursor;
adding a core material into the solution of the polymer precursor, and stirring, to obtain a mixed slurry, wherein the core material is one or more selected from a silicon-based negative electrode material and a tin-based negative electrode material;
placing the mixed slurry in a spray dryer or a wet coating machine, and drying it under an non-oxidizing inert gas atmosphere, to obtain a solid powder; and
performing heat treatment to the solid powder under a non-oxidizing inert gas atmosphere at a temperature of from 200° C. to 450° C., to obtain the negative electrode active material;
wherein the negative electrode active material comprises the core material and a polymer-modified coating on at least a part of a surface of the core material; the core material is one or more of a silicon-based negative electrode material and a tin-based negative electrode material; and the negative electrode active material has a weight loss rate satisfying 0.2%≤weight loss rate≤2% in a thermogravimetric analysis test wherein the temperature is elevated from 25° C. to 800° C. under a non-oxidizing inert gas atmosphere.

20. A battery, comprising the negative electrode active material according to claim 1.

21. A battery module, comprising the battery according to claim 20.

22. A battery pack, comprising the battery module according to claim 21.

23. An apparatus, comprising the battery according to claim 20.

* * * * *